US012619023B2

(12) United States Patent
Chriki et al.

(10) Patent No.: US 12,619,023 B2
(45) Date of Patent: May 5, 2026

(54) OPTICAL SYSTEMS INCLUDING LIGHT-GUIDE OPTICAL ELEMENTS FOR TWO-DIMENSIONAL EXPANSION WITH RETARDER ELEMENT

(71) Applicant: Lumus Ltd., Ness Ziona (IL)

(72) Inventors: Ronen Chriki, Lod (IL); Elad Sharlin, Mishmar David (IL); Tsion Eisenfeld, Ashkelon (IL); Shimon Grabarnik, Rehovot (IL)

(73) Assignee: Lumus Ltd., Ness Ziona (IL)

( * ) Notice: Subject to any disclaimer, the term of this patent is extended or adjusted under 35 U.S.C. 154(b) by 443 days.

(21) Appl. No.: 18/024,983

(22) PCT Filed: Sep. 20, 2021

(86) PCT No.: PCT/IL2021/051143
§ 371 (c)(1),
(2) Date: Mar. 7, 2023

(87) PCT Pub. No.: WO2022/175934
PCT Pub. Date: Aug. 25, 2022

(65) Prior Publication Data
US 2023/0314689 A1 Oct. 5, 2023

Related U.S. Application Data

(60) Provisional application No. 63/149,681, filed on Feb. 16, 2021.

(51) Int. Cl.
*F21V 8/00* (2006.01)
*G02B 27/01* (2006.01)

(52) U.S. Cl.
CPC ....... *G02B 6/0035* (2013.01); *G02B 27/0172* (2013.01)

(58) Field of Classification Search
CPC ........ G02B 2027/0118; G02B 27/0103; G02B 27/0101; G02B 2027/0174;
(Continued)

(56) References Cited

U.S. PATENT DOCUMENTS 2,748,659 A 6/1956 Geffcken et al.
2,795,069 A 6/1957 George
(Continued)

FOREIGN PATENT DOCUMENTS

CN 104503087 A 4/2015
CN 109613644 A 4/2019
(Continued)

OTHER PUBLICATIONS

Da-Yong et al., "A Continuous Membrance Micro Deformable Mirror Based on Anodic Bonding of SOI to Glass Water", Microsystem Technologies, Micro and Nanosystems Information Storage and Processing Systems, vol. 16, No. 10, May 20, 2010 pp. 1765-1769.

*Primary Examiner* — Jonathan Y Jung
(74) *Attorney, Agent, or Firm* — Rivka Friedman

(57) ABSTRACT

An optical system for directing image illumination injected at a coupling-in region to an eye-motion box for viewing by an eye of a user, including a light-guide optical element (LOE) formed from transparent material that includes: a first region containing a first set of planar, mutually-parallel, partially-reflecting surfaces having a first orientation; a second region containing a second set of planar, mutually-parallel, partially-reflecting surfaces having a second orientation non-parallel to the first orientation; a set of mutually-parallel major external surfaces extending across the first and second regions, and an optical retarder deployed between the first region and the second region so as to rotate
(Continued)

a polarization of light deflected by the first set of partially-reflecting surfaces prior to reaching the second set of partially-reflecting surfaces.

17 Claims, 14 Drawing Sheets

(58) Field of Classification Search
CPC .............. G02B 27/0081; G02B 6/0035; G02B 27/4272; G02B 6/06; G02B 5/3083; G02B 27/145; G02B 6/0055; G02B 6/0018
See application file for complete search history.

(56) References Cited

U.S. PATENT DOCUMENTS

| | | |
|---|---|---|
| 2,886,911 A | 5/1959 | George |
| 3,491,245 A | 1/1970 | George |
| 3,626,394 A | 12/1971 | Nelson et al. |
| 3,667,621 A | 6/1972 | Barlow |
| 3,677,621 A | 7/1972 | Smith |
| 3,737,212 A | 6/1973 | Antonson et al. |
| 3,802,763 A | 4/1974 | Cook et al. |
| 3,857,109 A | 12/1974 | Pilloff |
| 3,873,209 A | 3/1975 | Schinke et al. |
| 3,940,204 A | 2/1976 | Withrington |
| 4,084,883 A | 4/1978 | Eastman et al. |
| 4,191,446 A | 3/1980 | Arditty et al. |
| 4,309,070 A | 1/1982 | Simon |
| 4,331,387 A | 5/1982 | Wentz |
| 4,516,828 A | 5/1985 | Steele |
| 4,613,216 A | 9/1986 | Herbec et al. |
| 4,711,512 A | 12/1987 | Upatnieks |
| 4,715,684 A | 12/1987 | Gagnon |
| 4,775,217 A | 10/1988 | Ellis |
| 4,798,448 A | 1/1989 | Van Raalte |
| 4,805,988 A | 2/1989 | Dones |
| 4,932,743 A | 6/1990 | Isobe et al. |
| 4,978,952 A | 12/1990 | Irwin |
| 5,033,828 A | 7/1991 | Haruta |
| 5,076,664 A | 12/1991 | Migozzi |
| 5,096,520 A | 3/1992 | Faris |
| 5,157,526 A | 10/1992 | Kondo et al. |
| 5,231,642 A | 7/1993 | Scifres et al. |
| 5,301,067 A | 4/1994 | Bleier et al. |
| 5,353,134 A | 10/1994 | Michel et al. |
| 5,367,399 A | 11/1994 | Kramer |
| 5,369,415 A | 11/1994 | Richard et al. |
| 5,453,877 A | 9/1995 | Gerbe et al. |
| 5,543,877 A | 8/1996 | Takashi et al. |
| 5,555,329 A | 9/1996 | Kuper et al. |
| 5,619,601 A | 4/1997 | Akashi et al. |
| 5,650,873 A | 7/1997 | Gal et al. |
| 5,680,209 A | 10/1997 | Meinrad |
| 5,724,163 A | 3/1998 | David |
| 5,751,480 A | 5/1998 | Kitagishi |
| 5,764,412 A | 6/1998 | Suzuki et al. |
| 5,829,854 A | 11/1998 | Jones |
| 5,883,684 A | 3/1999 | Millikan et al. |
| 5,896,232 A | 4/1999 | Budd et al. |
| 5,919,601 A | 7/1999 | Nguyen et al. |
| 5,966,223 A | 10/1999 | Yaakov et al. |
| 5,982,536 A | 11/1999 | Swan |
| 6,021,239 A | 2/2000 | Minami et al. |
| 6,052,500 A | 4/2000 | Takano et al. |
| 6,091,548 A | 7/2000 | Chen |
| 6,144,347 A | 11/2000 | Mizoguchi et al. |
| 6,356,392 B1 | 3/2002 | Spitzer |
| 6,490,104 B1 | 12/2002 | Gleckman et al. |
| 6,626,906 B1 | 9/2003 | Young |
| 6,671,100 B1 | 12/2003 | McRuer et al. |
| 6,762,801 B2 | 7/2004 | Weiss et al. |
| 6,799,859 B1 | 10/2004 | Ida et al. |
| 7,391,573 B2 | 6/2008 | Amitai |
| 7,457,040 B2 | 11/2008 | Amitai |
| 7,589,901 B2 | 9/2009 | DeJong et al. |
| 7,724,443 B2 | 5/2010 | Amitai |
| 7,751,122 B2 | 7/2010 | Amitai |
| 7,839,575 B2 | 11/2010 | DeJong et al. |
| 8,098,439 B2 | 1/2012 | Amitai et al. |
| 8,140,197 B2 | 3/2012 | Lapidot et al. |
| 8,405,573 B2 | 3/2013 | Lapidot et al. |
| 8,432,614 B2 | 4/2013 | Amitai |
| 8,655,178 B2 | 2/2014 | Capron et al. |
| 8,736,963 B2 | 5/2014 | Robbins et al. |
| 8,743,464 B1 | 6/2014 | Amirparviz |
| 8,870,384 B2 | 10/2014 | Imai et al. |
| 9,025,253 B2 | 5/2015 | Hadad et al. |
| 9,039,906 B2 | 5/2015 | Schulz et al. |
| 9,285,591 B1 | 3/2016 | Gupta |
| 9,805,633 B2 | 10/2017 | Zheng |
| 10,133,070 B2 | 11/2018 | Danziger |
| 10,359,632 B2 | 7/2019 | Schultz |
| 10,437,068 B2 | 10/2019 | Weng |
| 10,509,241 B1 | 12/2019 | Robbins et al. |
| 10,585,290 B2 | 3/2020 | Cai et al. |
| 10,732,461 B2 | 8/2020 | Yoshida |
| 10,739,512 B2 | 8/2020 | Eisenfeld et al. |
| 10,996,475 B2 | 5/2021 | Wu |
| 11,256,100 B2 | 2/2022 | Schultz et al. |
| 2002/0015233 A1 | 2/2002 | Park |
| 2002/0191297 A1 | 12/2002 | Gleckman et al. |
| 2003/0007157 A1 | 1/2003 | Hulse et al. |
| 2003/0020006 A1 | 1/2003 | Janeczko et al. |
| 2003/0063042 A1 | 4/2003 | Friesem et al. |
| 2003/0090439 A1 | 5/2003 | Spitzer et al. |
| 2003/0165017 A1 | 9/2003 | Amitai et al. |
| 2003/0197938 A1 | 10/2003 | Schmidt et al. |
| 2003/0218718 A1 | 11/2003 | Moliton et al. |
| 2004/0085649 A1 | 5/2004 | Repetto et al. |
| 2004/0137189 A1 | 7/2004 | Tellini et al. |
| 2005/0018308 A1 | 1/2005 | Cassarly et al. |
| 2005/0084210 A1 | 4/2005 | Cha |
| 2005/0174641 A1 | 8/2005 | Greenberg |
| 2005/0174658 A1 | 8/2005 | Long et al. |
| 2005/0180687 A1 | 8/2005 | Amitai et al. |
| 2005/0265044 A1 | 12/2005 | Chen et al. |
| 2006/0126182 A1 | 6/2006 | Levola |
| 2006/0268421 A1 | 11/2006 | Shimizu et al. |
| 2006/0291021 A1 | 12/2006 | Mukawa |
| 2007/0070859 A1 | 3/2007 | Hirayama |
| 2008/0094586 A1 | 4/2008 | Hirayama |
| 2008/0151379 A1 | 6/2008 | Amitai |
| 2008/0198471 A1 | 8/2008 | Amitai |
| 2008/0278812 A1 | 11/2008 | Amitai |
| 2009/0122414 A1 | 5/2009 | Amitai |
| 2009/0190222 A1* | 7/2009 | Simmonds ......... G02B 27/0101 359/630 |
| 2010/0021465 A1 | 1/2010 | Lobanenkov et al. |
| 2010/0067110 A1 | 3/2010 | Yaakov et al. |
| 2010/0111472 A1 | 5/2010 | DeJong |
| 2010/0201953 A1* | 8/2010 | Freeman .............. G02B 27/149 353/121 |
| 2010/0202128 A1 | 8/2010 | Saccomanno |
| 2010/0278480 A1 | 11/2010 | Vasylyev et al. |
| 2010/0291489 A1 | 11/2010 | Moskovits et al. |
| 2011/0277361 A1 | 11/2011 | Nichol et al. |
| 2012/0039576 A1 | 2/2012 | Dangel et al. |
| 2012/0147361 A1 | 6/2012 | Mochizuki et al. |
| 2012/0206817 A1 | 8/2012 | Totani et al. |
| 2012/0306940 A1 | 12/2012 | Machida et al. |
| 2013/0007833 A1 | 1/2013 | Kitazato et al. |
| 2013/0321432 A1 | 12/2013 | Burns et al. |
| 2013/0334504 A1 | 12/2013 | Thompson et al. |
| 2014/0003762 A1 | 1/2014 | Macnamara |
| 2014/0043688 A1 | 2/2014 | Schrader et al. |
| 2014/0160577 A1 | 6/2014 | Dominic et al. |
| 2014/0185142 A1 | 7/2014 | Gupta et al. |
| 2014/0226215 A1 | 8/2014 | Komatsu et al. |
| 2014/0374377 A1 | 12/2014 | Schulz et al. |
| 2015/0016777 A1 | 1/2015 | Abovitz et al. |
| 2015/0081313 A1 | 3/2015 | Boross et al. |
| 2015/0138646 A1 | 5/2015 | Tatsugi |

(56)  References Cited

U.S. PATENT DOCUMENTS

| | | |
|---|---|---|
| 2015/0160529 A1 | 6/2015 | Popovich et al. |
| 2015/0219834 A1 | 8/2015 | Nichol et al. |
| 2015/0247976 A1 | 9/2015 | Abovitz |
| 2015/0338655 A1 | 11/2015 | Sawada et al. |
| 2016/0116743 A1 | 4/2016 | Amitai |
| 2016/0170214 A1 | 6/2016 | Amitai |
| 2016/0234485 A1 | 8/2016 | Robbins et al. |
| 2016/0341964 A1 | 11/2016 | Amitai |
| 2017/0242249 A1 | 8/2017 | Wall |
| 2017/0285346 A1 | 10/2017 | Pan |
| 2017/0293140 A1 | 10/2017 | Cai et al. |
| 2017/0315346 A1 | 11/2017 | Tervo et al. |
| 2017/0343822 A1 | 11/2017 | Border et al. |
| 2017/0371160 A1 | 12/2017 | Schultz |
| 2018/0052277 A1* | 2/2018 | Schowengerdt ..... G02B 6/0016 |
| 2018/0210202 A1* | 7/2018 | Danziger ................ G02B 5/30 |
| 2018/0267312 A1 | 9/2018 | Melli |
| 2018/0284448 A1 | 10/2018 | Matsuki et al. |

| | | |
|---|---|---|
| 2018/0348562 A1 | 12/2018 | Yoshida |
| 2019/0212487 A1 | 7/2019 | Danziger |
| 2020/0011021 A1 | 1/2020 | Zhang |
| 2020/0116995 A1* | 4/2020 | Chi ...................... G02B 6/0035 |
| 2020/0183159 A1 | 6/2020 | Danziger |
| 2020/0192101 A1 | 6/2020 | Ayres et al. |
| 2020/0249481 A1 | 8/2020 | Danziger et al. |
| 2020/0292818 A1 | 9/2020 | Amitai et al. |
| 2020/0292819 A1 | 9/2020 | Danziger et al. |
| 2021/0018755 A1 | 1/2021 | Amitai |
| 2021/0333862 A1 | 10/2021 | Shimizu |
| 2022/0128816 A1 | 4/2022 | Danziger et al. |
| 2022/0244546 A1 | 8/2022 | Amitai |
| 2023/0266593 A1 | 8/2023 | Eisenfeld |

FOREIGN PATENT DOCUMENTS

| | | |
|---|---|---|
| JP | 2003140081 | 5/2003 |
| JP | 2011012141 A | 1/2011 |

* cited by examiner

PRIOR ART

PRIOR ART

19

18

38

OPTICAL SYSTEMS INCLUDING LIGHT-GUIDE OPTICAL ELEMENTS FOR TWO-DIMENSIONAL EXPANSION WITH RETARDER ELEMENT

TECHNICAL FIELD

The presently disclosed subject matter relates to optical systems, and, more particularly, to optical systems that include light-guide optical elements (LOE) configured for two-dimensional image expansion.

BACKGROUND

Recent years have seen an influx in consumer demand for head mounted displays (HMD) and "smart" eye-wear such as augmented reality (AR) glasses, collectively referred to herein as near eye display systems. Accordingly, in this rapidly developing area of technology there is a growing need for optical systems that are more compact and light weight, and yet still provide a relatively large field of view (FOV) and produce bright, high quality images.

Some of the known optical systems employ a waveguide (also referred to herein as "light guide", "light-guide optical element" or "LOE") to expand an input image by propagating the image along a substrate in which is embedded one or more sets of partially reflective internal surfaces ("facets"). One of the known problems with this type of optical system is the loss of small amounts of light due to polarization mismatch between partial reflections from non-parallel facets.

GENERAL DESCRIPTION

According to one aspect of the presently disclosed subject matter there is provided an optical system for directing image illumination injected at a coupling-in region to an eye-motion box for viewing by an eye of a user, the optical system including a light-guide optical element (LOE) formed from transparent material, the LOE including: a first region containing a first set of planar, mutually-parallel, partially-reflecting surfaces having a first orientation; a second region containing a second set of planar, mutually-parallel, partially-reflecting surfaces having a second orientation non-parallel to the first orientation; a set of mutually-parallel major external surfaces, the major external surfaces extending across the first and second regions such that both the first set of partially-reflecting surfaces and the second set of partially-reflecting surfaces are located between the major external surfaces, wherein the second set of partially-reflecting surfaces are at an oblique angle to the major external surfaces so that a part of image illumination propagating within the LOE by internal reflection at the major external surfaces from the first region into the second region is coupled out of the LOE towards the eye-motion box, and wherein the first set of partially-reflecting surfaces are oriented so that a part of image illumination propagating within the LOE by internal reflection at the major external surfaces from the coupling-in region is deflected towards the second region, the LOE further including an optical retarder deployed between the first region and the second region so as to rotate a polarization of light deflected by the first set of partially-reflecting surfaces prior to reaching the second set of partially-reflecting surfaces.

According to some aspects, the optical system includes a compact image projector (POD) optically coupled to the LOE so as to inject the image illumination into the coupling-in region of the LOE such that the image illumination becomes trapped in one dimension by internal reflection at the set of major external surfaces.

According to some aspects, the POD is configured to generate a collimated image, collimated to infinity, such that the image illumination spans a range of angles corresponding to an angular field of view in two dimensions.

According to some aspects, the first set of partially-reflecting surfaces are oriented orthogonal to the major external surfaces of the LOE.

According to some aspects, the first set of partially-reflecting surfaces are oriented obliquely to the major external surfaces of the LOE.

According to some aspects, both the image illumination and a conjugate of the image illumination are deflected into the second region.

According to some aspects, either the image illumination or a conjugate of the image illumination is deflected into the second region.

According to some aspects, the first set of partially-reflecting surfaces successively reflect a proportion of the image illumination propagating within the first region such that the image illumination undergoes expansion in a first dimension.

According to some aspects, the second set of partially-reflecting surfaces successively reflect a proportion of the image illumination propagating within the second region such that the image illumination undergoes expansion in a second dimension.

According to some aspects, the first region is configured to achieve aperture expansion in one of an x-axis or y-axis direction, and the second region is configured to achieve aperture expansion in the other one of the x-axis or y-axis direction.

According to some aspects, the first and second set of partially-reflecting surfaces are implemented as internal surfaces coated with dielectric thin film coatings configured to reflect light that impinges on the internal surfaces over a predetermined range of angles.

According to some aspects, the retarder is deployed within the LOE such that the retarder extends between the major external surfaces substantially perpendicular to the major external surfaces.

According to some aspects, the retarder is deployed within the LOE such that the retarder extends between the major external surfaces at an oblique angle relative to the major external surfaces.

According to some aspects, the retarder is deployed within the LOE such that the retarder is oriented substantially parallel to the major external surfaces.

According to some aspects, the retarder is oriented substantially adjacent to one of the major external surfaces.

BRIEF DESCRIPTION OF THE DRAWINGS

In order to understand the invention and to see how it can be carried out in practice, embodiments will be described, by way of non-limiting examples, with reference to the accompanying drawings, in which.

DETAILED DESCRIPTION OF PREFERRED EMBODIMENTS

In the following detailed description, numerous specific details are set forth in order to provide a thorough understanding of the invention. However, it will be understood by those skilled in the art that the presently disclosed subject matter may be practiced without these specific details. In other instances, well-known methods, procedures, and components have not been described in detail so as not to obscure the presently disclosed subject matter.

By way of background, near eye displays that employ waveguides for image expansion typically include or are coupled to a projector that injects an image into a waveguide made of a transparent substrate that propagates the image by total internal reflection (TIR) between parallel external surfaces of the waveguide. Optical elements such as partially reflective internal surfaces embedded within the waveguide redirect the image either toward the viewer in the case of a one-dimensional waveguide, or to a second waveguide in the case of a two-dimensional waveguide. In the latter case, the second waveguide propagates the image along an axis perpendicular to the first waveguide, again via TIR, thereby expanding the image in a second dimension. Facets embedded in the second waveguide couple-out the expanded image towards the viewer.

Although this disclosure relates primarily to partially reflective surfaces as the out-coupling method, it should be noted that the techniques described herein are similarly applicable to waveguides employing other optical out-coupling elements (e.g. diffractive elements or combinations of reflective and diffractive elements, etc.) with appropriate modification, as will be detailed below with reference to FIGS. 9A-9B. Similarly, this disclosure relates primarily to a waveguide configured for two-dimensional image expansion, although the techniques disclosed herein can also be applied to one-dimensional waveguides with appropriate modification as would be known to persons skilled in the art.

Figures 1A, 1B:
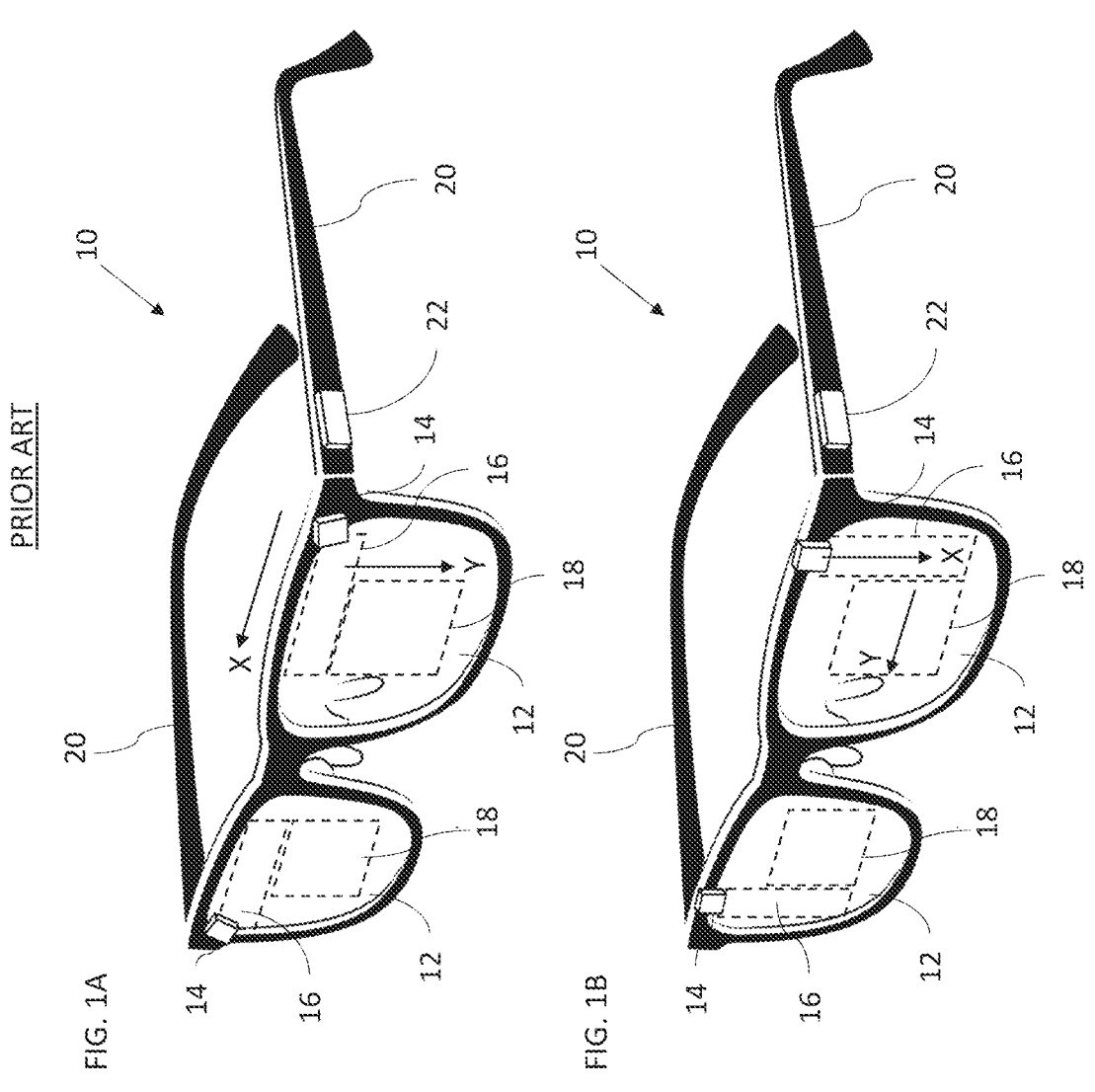
FIGS. 1A-1D illustrate examples of near eye display systems employing an LOE for two-dimensional image expansion according to the prior art.

FIGS. 1A and 1B illustrate schematically an exemplary implementation of a known device in the form of a near-eye display, generally designated 10, within which an LOE 12 may be deployed. The near-eye display 10 employs a compact image projector (or "POD") 14 optically coupled to an LOE 12 so as to inject an image (also referred to herein as "image illumination") into LOE 12 such that the image light is trapped in one dimension by internal reflection at a set of mutually-parallel planar external surfaces of LOE 12. The light impinges on a set of facets that are parallel to each other, and inclined obliquely to the direction of propagation of the image light, with each successive facet deflecting a proportion of the image light into a deflected direction, also trapped/guided by internal reflection within the substrate. This first set of facets are not illustrated individually in FIGS. 1A and 1B, but are located in a first region of the LOE designated region 16. This partial reflection at successive facets achieves a first dimension of optical aperture expansion.

In some embodiments, the aforementioned set of facets are orthogonal to the major external surfaces of the substrate. In this case, both the injected image and its conjugate undergoing internal reflection as they propagate within region 16 and are deflected and become conjugate images propagating in a deflected direction. In other embodiments, the first set of facets are obliquely angled relative to the major external surfaces of the LOE. In the latter case, either the injected image or its conjugate forms the desired deflected image propagating within the LOE, while the other reflection may be minimized, for example, by employing angularly-selective coatings on the facets which render them relatively transparent to the range of incident angles presented by the image whose reflection is not needed.

The first set of facets deflect the image illumination from a first direction of propagation trapped by total internal reflection (TIR) within the substrate to a second direction of propagation, also trapped by TIR within the substrate. The deflected image illumination then passes into a second substrate region 18, which may be implemented as an adjacent distinct substrate or as a continuation of a single substrate, in which a coupling-out arrangement (either a further set of partially reflective facets or a diffractive optical element) progressively couples out a proportion of the image illumination towards the eye of an observer located within a region defined as the eye-motion box, thereby achieving a second dimension of optical aperture expansion.

The overall device 10 may be implemented separately for each eye, and is preferably supported relative to the head of a user with each LOE 12 facing a corresponding eye of the user. In one particularly preferred option as illustrated here, a support arrangement is implemented as an eye glasses frame with sides 20 for supporting the device relative to ears of the user. Other forms of support arrangement may also be used, including but not limited to, head bands, visors or devices suspended from helmets.

Reference is made herein in the drawings and claims to an X axis which extends horizontally (FIG. 1A) or vertically (FIG. 1B), in the general extensional direction of the first region of the LOE, and a Y axis which extends perpendicular thereto, i.e., vertically in FIG. 1A and horizontally in FIG. 1B.

In very approximate terms, the first region 16 of LOE 12, may be considered to achieve aperture expansion in the X direction while the second region 18 of LOE 12, achieves aperture expansion in the Y direction. It should be noted that the orientation as illustrated in FIG. 1A may be regarded as a "top-down" implementation, where the image illumination entering the main (second region) of the LOE enters from the top edge, whereas the orientation illustrated in FIG. 1B may be regarded as a "side-injection" implementation, where the axis referred to here as the Y axis is deployed horizontally. In the remaining drawings, the various features of certain embodiments of the present invention will be illustrated in the context of either a top-down orientation or side-injection, however, it should be appreciated that all of those features are equally applicable to both implementations.

The POD employed with the devices of the present invention is preferably configured to generate a collimated image, i.e., in which the light of each image pixel is a parallel beam, collimated to infinity, with an angular direction corresponding to the pixel position. The image illumination thus spans a range of angles corresponding to an angular field of view in two dimensions.

Image projector 14 includes at least one light source, typically deployed to illuminate a spatial light modulator, such as an LCOS chip. The spatial light modulator modulates the projected intensity of each pixel of the image, thereby generating an image. Alternatively, the image projector may include an array of LEDs, (typically implemented using a micro LED array or an OLED array), or possibly a scanning arrangement, typically implemented using a fast-scanning mirror, which scans illumination from a laser light source across an image plane of the projector while the intensity of the beam is varied synchronously with the motion on a pixel-by-pixel basis, thereby projecting a desired intensity for each pixel. In all cases, collimating optics are provided to generate an output projected image which is collimated to infinity. Some or all of the above components are typically arranged on surfaces of one or more polarizing beam splitter (PBS) cubes or other prism arrangement, as is well known in the art.

Optical coupling of image projector 14 to LOE 12 may be achieved by any suitable optical coupling, such as for example via a coupling prism with an obliquely angled input surface, or via a reflective coupling arrangement, via a side edge and/or one of the major external surfaces of the LOE. Details of the coupling-in configuration are not critical to the invention, and are shown here schematically as a non-limiting example of a wedge prism 15 applied to one of the major external surfaces of the LOE.

It will be appreciated that the near eye display device 10 includes various additional components, typically including a controller 22 for actuating the image projector 14, typically employing electrical power from a small onboard battery (not shown) or some other suitable power source. It will be appreciated that controller 22 includes all necessary electronic components such as at least one processor or processing circuitry to drive the image projector, all as is known in the art.

Figures 1C, 1D:
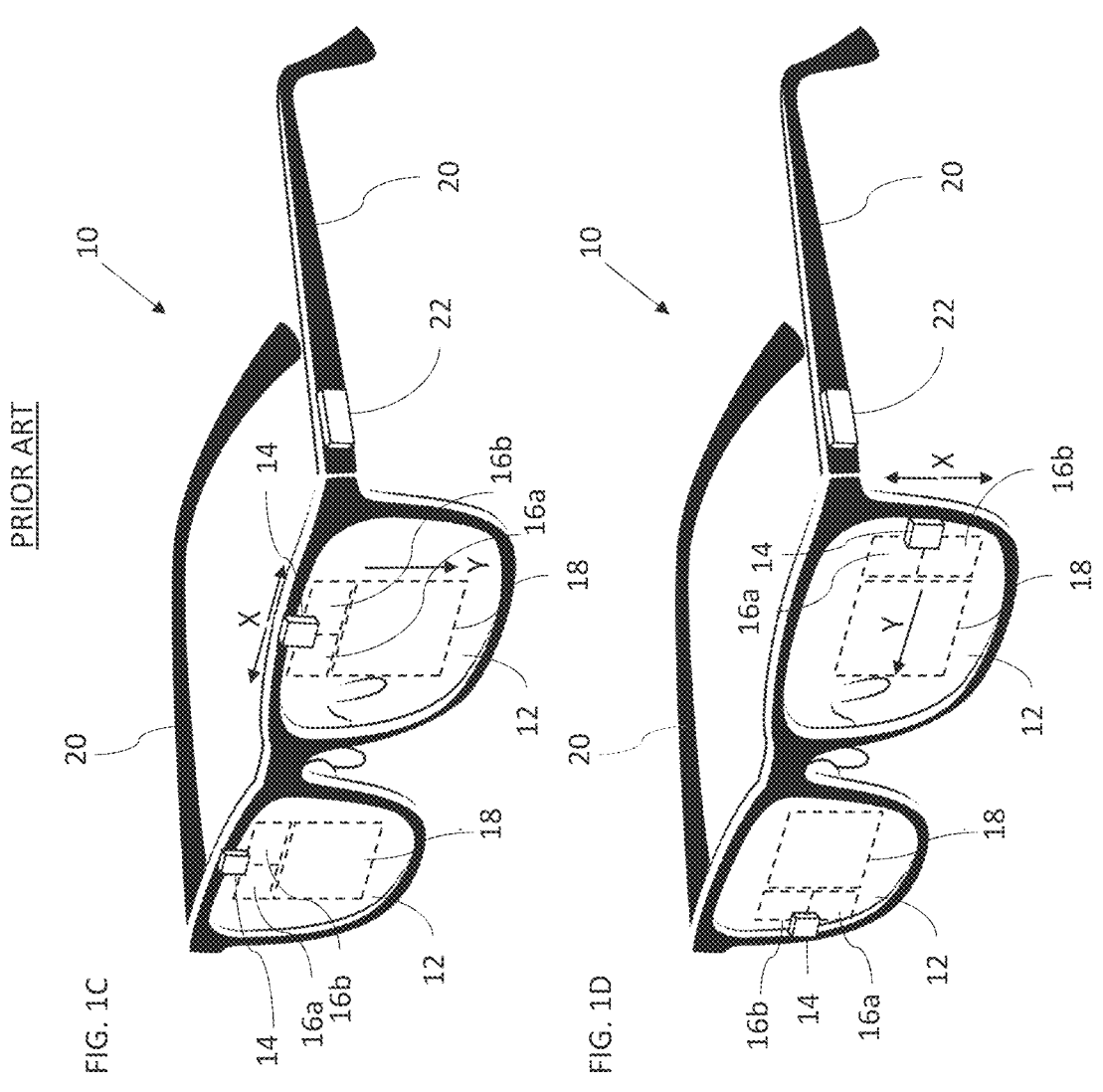

FIGS. 1C-1D illustrate schematically another example of an existing near eye display system 10 of three types of embedded elements. As in FIGS. 1A-1B, a projector (POD) 14 injects an image into an LOE 12, where light is confined in one dimension by TIR to a region that lies between the two parallel major external surfaces of the LOE. Light rays of the image propagate in a certain angular orientation inside the waveguide till they are reflected by one of two sets of mutually-parallel facets that lie in regions 16*a* and 16*b*. These two mutually-parallel facets redirect the light rays to a different angular orientation, that is also confined in one dimension by TIR to the region between two parallel major surfaces of the LOE. The light rays are then reflected a second time by the facets in regions 16*a* and 16*b*, respectively, such that they return to their original orientation when injected into the LOE. Finally, the light rays are reflected by a third set of mutually parallel facets in region 18 that redirect the light rays, such that the injected image is out-coupled from the LOE and propagated towards the eye motion box, where the observer's eye is located.

Figure 2A:
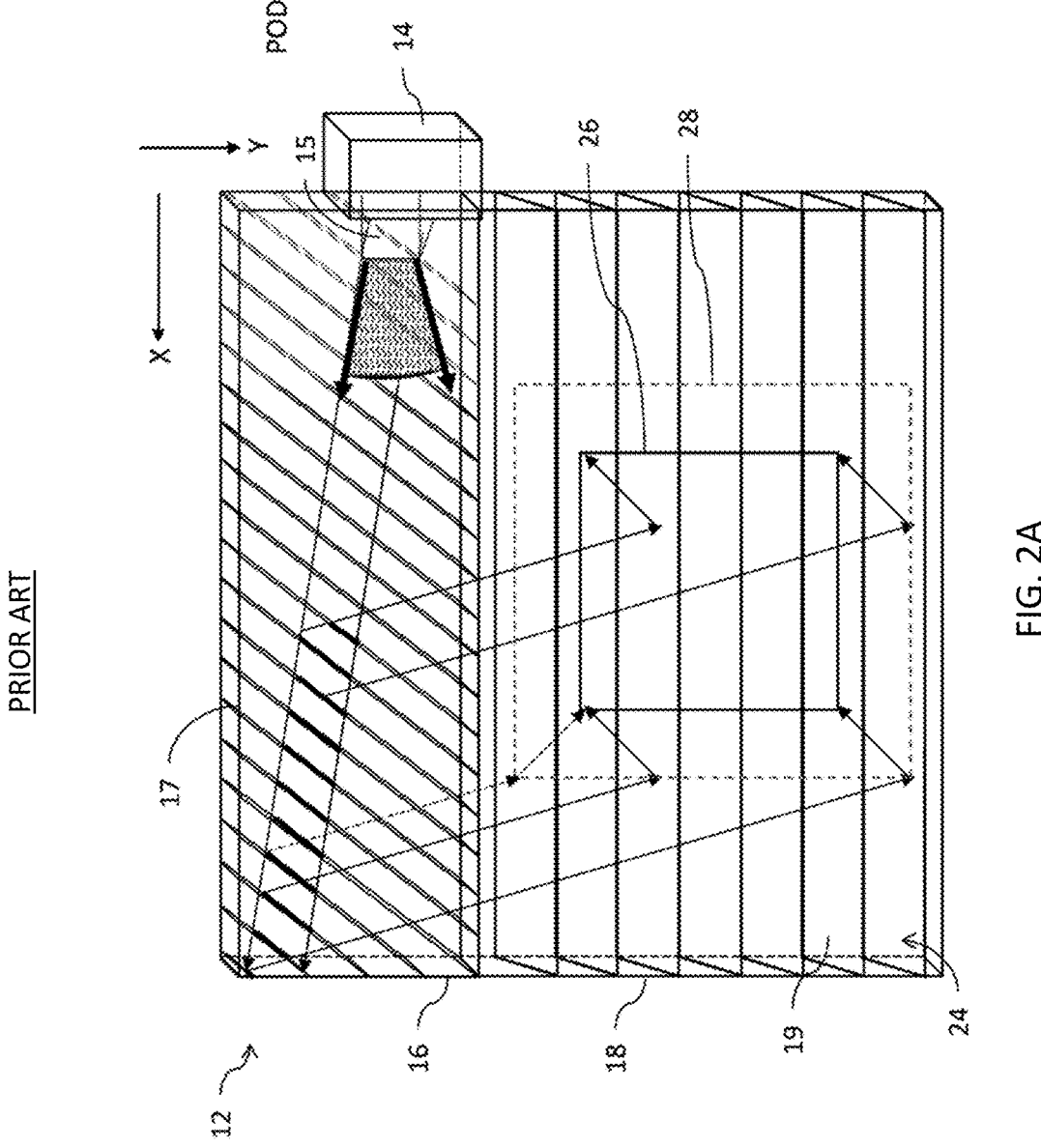
FIGS. 2A-2B illustrate an enlarged view of the LOE of FIGS. 1A-1B according to the prior art.

Turning now to FIG. 2A, the optical properties of an implementation of the near eye display are illustrated in more detail. Specifically, there is shown a more detailed view of a light-guide optical element (LOE) 12 formed from transparent material, including a first region 16 containing a first set of planar, mutually-parallel, partially-reflecting surfaces 17 having a first orientation, and a second region 18 containing a second set of planar, mutually-parallel, partially-reflecting surfaces 19 having a second orientation non-parallel to the first orientation. A set of mutually-parallel major external surfaces 24 extend across the first and second regions 16 and 18 such that both the first set of partially-reflecting surfaces 17 and the second set of partially-reflecting surfaces 19 are located between the major external surfaces 24. Most preferably, the set of major external surfaces 24 are a pair of surfaces which are each continuous across the entirety of first and second regions 16 and 18, although the option of having a set down or a step up in thickness between the regions 16 and 18 also falls within the scope of the present invention. Regions 16 and 18 may be immediately juxtaposed so that they meet at a boundary, which may be a straight boundary or some other form of boundary, or there may be one or more additional LOE region interposed between those regions, to provide various additional optical or mechanical function, depending upon the particular application. Although the present invention is not limited to any particular manufacturing technique, in certain particularly preferred implementations, particularly high quality major external surfaces are achieved by employing continuous external plates between which the separately formed regions 16 and 18 are sandwiched to form the compound LOE structure.

The optical properties of the LOE may be understood by tracing the image illumination paths backwards. The second set of partially-reflecting surfaces 19 are at an oblique angle to the major external surfaces 24 so that a part of image illumination propagating within the LOE 12 by internal reflection at the major external surfaces from the first region 16 into the second region 18 is coupled-out of the LOE towards an eye-motion box 26. The first set of partially-reflecting surfaces 17 are oriented so that a part of image illumination propagating within the LOE 12 by internal reflection at the major external surfaces from the coupling-in region (coupling prism 15) is deflected towards the second region 18.

One dimension of the angular spread of the projected image from image projector 14 is represented in FIG. 2A by the cone of illumination spreading (projected onto the plane of major external surfaces 24) from the POD aperture on the right side of the LOE towards the left side of the LOE. In the non-limiting example illustrated here, the central optical axis of the POD defines a direction of propagation within the LOE aligned with the X axis, and the angular spread (within the LOE) is roughly ±16°. (It should be noted that the angular FOV becomes larger in air due to the change in refractive index.) The first set of partially-reflecting surfaces 17 are illustrated in first region 16, and the second set of partially-reflecting surfaces 19 are illustrated in second region 18.

The near-eye display is designed to provide a full FOV of the projected image to an eye of the user that is located at some position within the permitted range of positions designated by eye-motion box (EMB) 26 (that is, a shape, typically represented as a rectangle, spaced away from the plane of the LOE from which the pupil of the eye will view the projected image). In order to reach the eye-motion box, light must be coupled-out from the second region 18 by the second set of partially-reflecting surfaces 19 towards the EMB 26. In order to provide the full image field-of-view, each point in the EMB must receive the entire angular range of the image from the LOE. Tracing back the field of view from the EMB indicates a larger rectangle 28 from which relevant illumination is coupled-out of the LOE towards the EMB.

FIG. 2A illustrates a first extremity of the FOV, corresponding to the bottom-left pixel of the projected image. A beam of a width corresponding to the optical aperture of the projector as coupled into the LOE is shown propagating leftwards and upwards from the POD and being partially reflected from a series of partially-reflecting surfaces 17. As illustrated here, only a subset of the facets generate reflections that are useful for providing the corresponding pixel in the image viewed by the user, and only a sub-region of those facets contribute to the observed image of this pixel. The relevant regions are illustrated by heavy black lines, and the rays corresponding to this pixel in the redirected image reflected from facets 17 and then coupled-out by facets 19 reaching the four corners of the EMB 26 are shown.

Figure 2B:
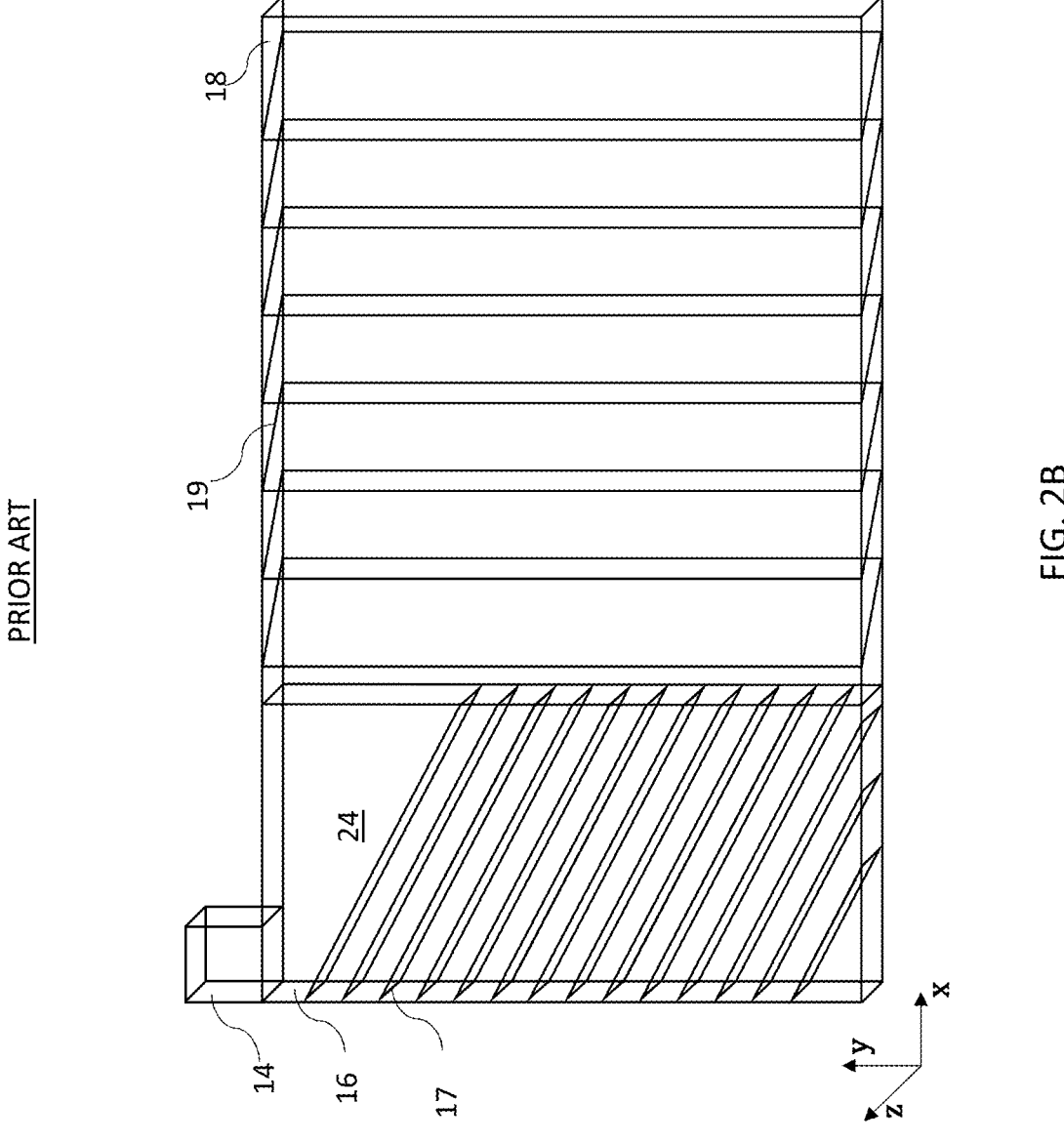

Here and throughout the description, it will be noted that only the in-plane propagation directions of the rays are illustrated here during propagation within the LOE, but the rays actually follow a zigzag path of repeated internal reflection from the two major external surfaces, and one entire dimension of the image field of view is encoded by the angle of inclination of the rays relative to the major external surfaces, corresponding to the pixel position in the Y dimension. By way of one additional example, deflected and coupled-out rays corresponding to the top-left extremity of the image as viewed at the top-left corner of the EMB are shown in dash-dot lines. FIG. 2B illustrates schematically the LOE of FIG. 2A, now rotated 90 degrees and having removed the light rays and eye motion box from FIG. 2A in order to help visualize the LOE.

Facets 17 and 19 are implemented as internal surfaces coated with partially reflective coatings, preferably dielectric thin film coatings, that are specifically engineered to partially reflect light that impinges on the surface over a predetermined range of angles, each angle associated with a given field, the range of angles thereby being associated with the entire FOV of the projected image. It should be noted that the light impinging on the facets includes light of different wavelengths across a relatively broad spectrum of wavelengths as determined by the illumination source. It should further be noted that generally speaking, the injected image may be polarized or unpolarized, and in each case the facet coatings must be designed accordingly. For instance, in the case that the injected image is unpolarized (i.e. includes both p-polarized and s-polarized light), the coating must be engineered to consider the effect of reflection of both p-polarized and s-polarized light rays.

By definition, the polarization state of light is defined in accordance with the angular orientation of a particular light ray (i.e. field k-vector, orientation of a plane wave), relative to the normal of a surface the ray impinges. Therefore, a polarized incident ray may have a certain polarization state as compared to one surface, and another polarization state as compared to a difference surface. It is therefore clear that as light propagates within an optical system that has many surfaces, the polarization state of an impingent light ray is defined in accordance with the direction of the incident ray and the angular orientation of the surface the ray impinges. As is apparent from FIG. 2A, as light propagates through the near eye display, the light impinges on the parallel external surfaces (also referred to herein as "faces") 24, the first set of facets and the second set of facets, each of which have a different angular orientation relative to one another. Accordingly, a polarized light ray associated with a certain field can be described as having a first polarization state relative to the LOE faces 24, a second polarization state relative to facets 17, and a third polarization state relative to facets 19. As the ray's polarization state relative to a surface impacts the ray's reflectance off that surface, ideally the partially reflective coatings of facets 17 would need to be engineered differently than the partially reflective coatings of facets 19 in order to achieve sufficiently high reflectance in each set of facets. Moreover, it is often extremely difficult to design optical coatings with the required optical properties at a certain polarization and angular range. For instance, it is extremely difficult, if at all possible, to design a high reflective coating for p-polarized light around Brewster's angle. Therefore, polarization mismatch of the illuminated light between the first and second sets of facets 17 and 19 may limit the feasibility of specific coating requirements, and may force a compromise on the initial polarization state. Furthermore, if the polarization state relative to the major external surfaces 24 at any point along the LOE 12 is a combination of s and p polarized light, the polarization will rotate upon TIR, causing significant differences in the reflectivity of light from different facets and for different fields, that may often result in dark stripes in the output image.

As noted above, a drawback of existing LOEs is that the polarization of the incoming light may vary in different regions of the LOE, and may be different relative to different sets of facets and relative to the major external surfaces of the LOE. Often this leads to an "impure" polarization of the injected image relative to the major surfaces. Since TIR induces different phases to s- and p-polarized light, the polarization of the injected image may rotate and vary as light propagates within the LOE. This may significantly complicate the design of the thin optical coatings of the facets, and it may reduce the output efficiency and cause local or global non-uniformities in the projected output image.

Figure 3:
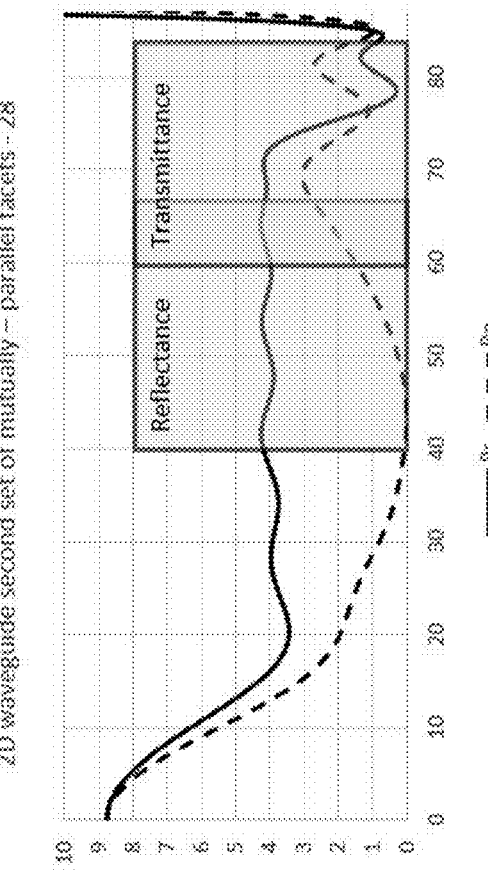
FIG. 3 illustrates the reflectance properties of light rays at given incident angles for s- and p-polarization states.

Also as noted, the degree of reflectivity of a particular light ray upon impingement of a surface varies in accordance with the ray's polarization state relative to the surface. FIG. 3 shows the reflectivity as a function of incident angle for an exemplary coating design for the first and second sets of facets. As evident, the reflectivity of p-polarized light drops to zero around Brewster's angle. For this reason, it is usually preferable for the light propagating through the display to be s-polarized, or at least mostly s-polarized, relative to facets 17 and 19 for maximum efficiency as well as simplicity of coating design.

Accordingly, the inventors have found that the efficiency as well as simplicity of a near eye display system employing a LOE configured for two-dimensional expansion can be improved by rotating the polarization of the propagating light between the first and second set of facets such that the light is always s-polarized (or at least mostly s-polarized) relative to both sets of facets. Note that by "efficiency", it is meant that more of the projected light initially coupled-in to the near eye display system is reflected toward the viewer, thereby resulting in a brighter and/or more uniform output image.

Figure 4:
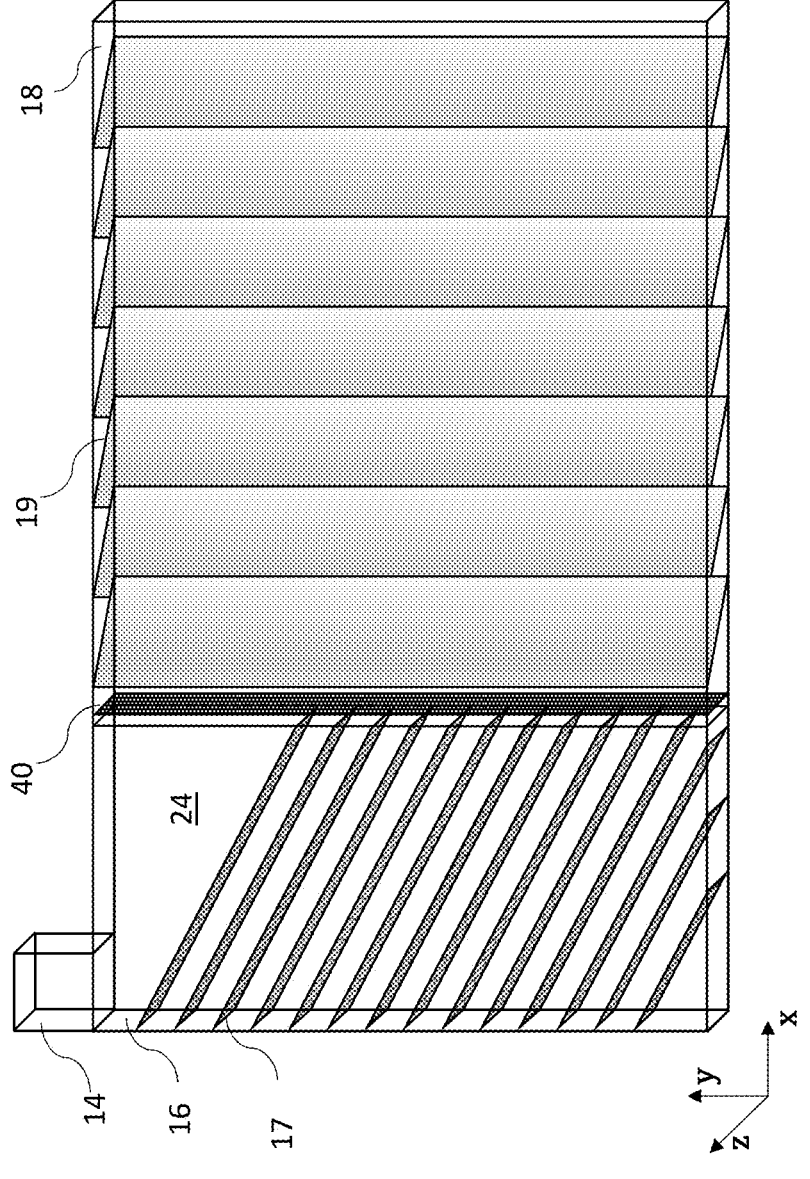
FIG. 4 illustrates an LOE with embedded retarder according to an embodiment of the disclosed subject matter.

FIG. 4 illustrates schematically an example of an LOE similar to the one shown in FIG. 2B, but now including an optical retarder 40 positioned along the light path between facets 17 (which in the example shown are orthogonal to the external surfaces) and facets 19 and configured to rotate the polarization of the light after reflection from facets 17 and prior to reflection from facets 19. Thus, assuming the light input to the LOE is s-polarized relative to facets 17, after reflection from facets 17 the light will be mostly p-polarized relative to facets 19. Retarder 40 then rotates the polarization so that the light is now s-polarized (or at least mostly s-polarized) relative to facets 19. Since now facets 17 and 19 both reflect s-polarized light relative to each set of facets' respective surfaces, no separate consideration of coating design is required. Furthermore, the retarder enables the light propagating inside the waveguide to be mostly purely polarized as compared to the major external surfaces, and therefore the polarization does not rotate due to TIR as light propagates inside the waveguide. As will be further detailed below, retarder 40 can be implemented in a variety of ways, including but not limited to, a half waveplate.

Figures 5A, 5B, 5C:
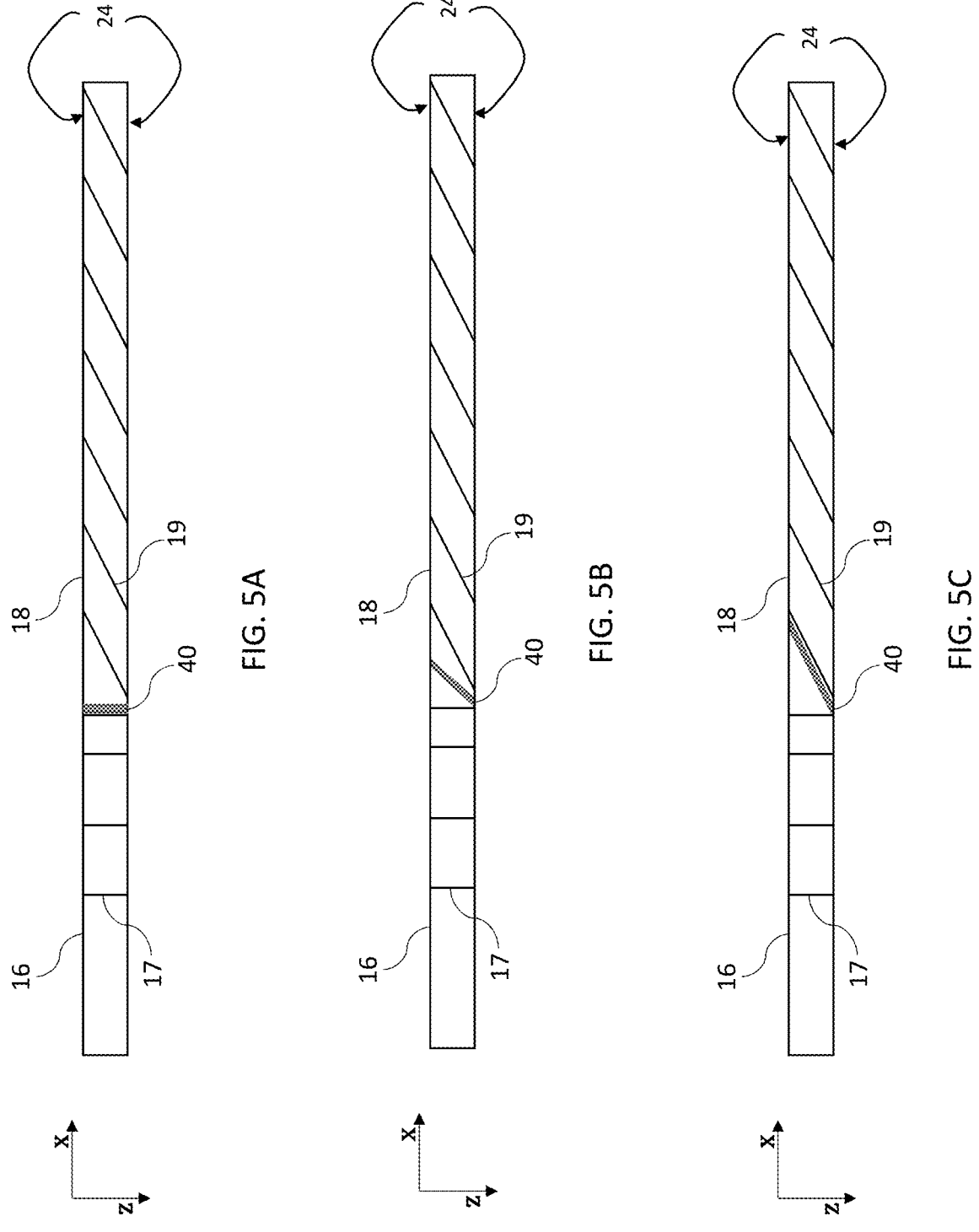
FIGS. 5A-5E illustrate various configurations of retarder 40 with an LOE, according to embodiments of the disclosed subject matter.

As illustrated in FIGS. 5A-5E, retarder 40 can be physically located at various possible locations within the LOE and oriented at various different angles. For example, as shown in FIG. 5A, the retarder can extend across the thickness (z-axis in the drawing) of the LOE, between the parallel faces, and oriented approximately perpendicular to the LOE faces. FIG. 5B illustrates another configuration in which retarder 40 is oriented at an angle relative to the faces of the LOE and non-parallel to facets 19. FIG. 5C illustrates a further configuration in which retarder 40 is oriented parallel to facets 19.

Figures 5D, 5E:
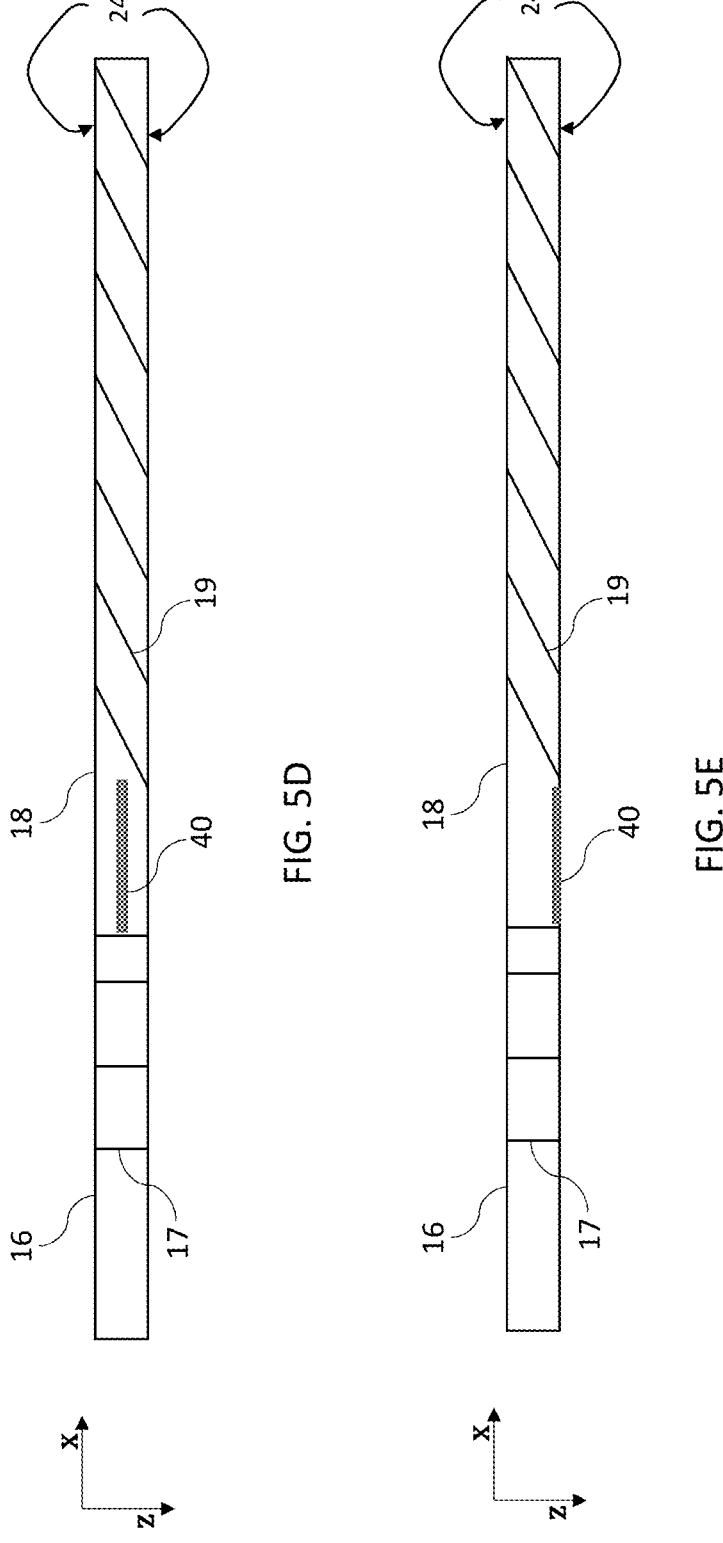

FIG. 5D illustrates yet another configuration in which retarder 40 is oriented parallel to the faces of the LOE and physically situated at some point between the faces, which may be the mid-point between the faces but is not necessarily limited as such. Finally, FIG. 5E illustrates yet another configuration in which retarder 40 is oriented parallel to the faces of the display and is physically situated adjacent to one of the faces.

It should be noted that in all cases, the retarder should be sized, positioned and/or angled such that all, or substantially all, the light reflected from facets 17 passes through the retarder prior to being reflected by facets 19.

It should further be noted that while the function performed by the retarder has thus far been described as only rotating the polarization of the light, in some cases it may be desirable for the retarder to perform additional functions as well. For example, referring to the configuration shown in FIG. 5D, retarder 40 could include a coating having 50% reflectivity. This would allow retarder 40 to additionally serve as a "mixer" and mix the propagated rays thereby improving the intensity uniformity of the output image. Near eye displays having embedded mixer elements have previously been described in PCT Publication WO2021001841A1.

Retarder 40 can be implemented in a variety of ways, including but not limited to, as a half waveplate, or a coated internal surface. Suitable coatings include, e.g., dielectric, birefringent, thin film polymers, crystalline retarders, geometric phase grating retarders, etc. In some embodiments, such as in the configuration shown in FIG. 5C, the retarder can be implemented as a coating applied to the first facet in the second set of facets.

Exemplary manufacturing methods for an LOE with retarder element will now be described with reference to FIGS. 6A-8E.

Figures 6A, 6B, 6C:
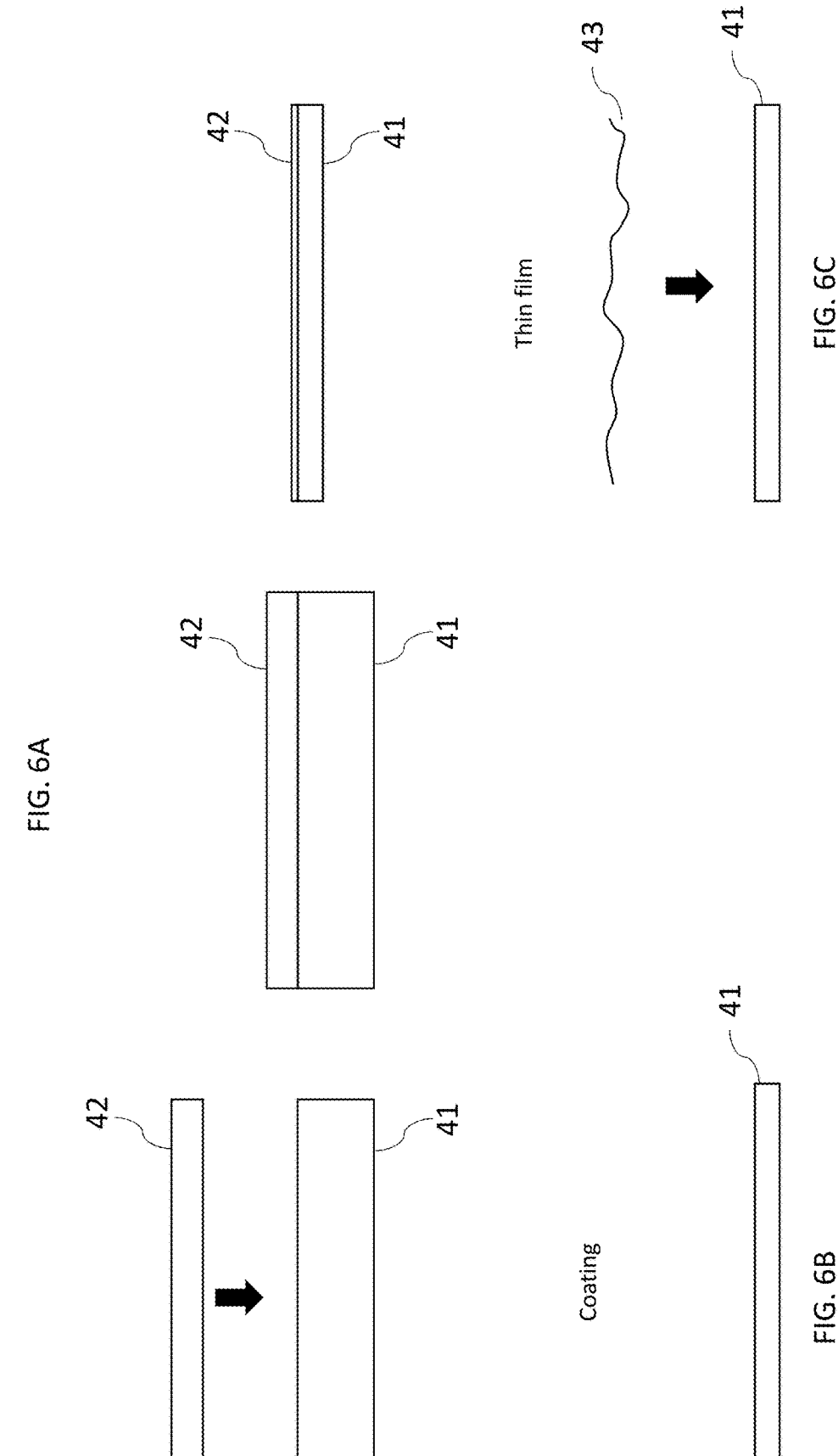
FIGS. 6A-6C illustrate known methods of producing an optical polarization retarder.

FIGS. 6A-6C illustrate schematically known methods for producing an optical retarder suitable for deployment within an LOE. In FIG. 6A, a retarder is produced from a crystalline material, e.g. quartz. A first transparent crystalline plate 42 made of a birefringent material is bonded to a transparent substrate 41. Substrate 41 is preferably made of the same material as the LOE. The combined structure is then thinned, e.g. by double side polishing, until the required thickness of the birefringent material is achieved. FIGS. 6B-6C illustrate alternative methods in which a retarder can be produced, either by coating a dielectric coating (homogeneous or non-homogenous) over the substrate 41 (FIG. 6B), or by bonding a polycrystalline thin film to substrate 41 (FIG. 6C).

Figure 7B:
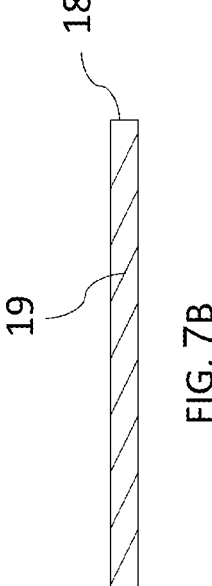
FIGS. 7A-7D illustrate an example of a manufacturing method for an LOE with embedded retarder according to an embodiment of the disclosed subject matter.
Figure 7A:
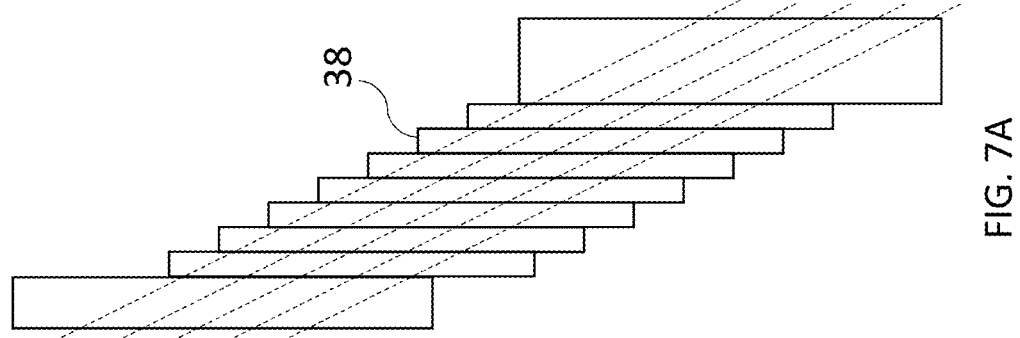

Next, the LOE region incorporating the second set of facets is formed according to known methods. FIG. 7A illustrate schematically forming LOE region 18 by stacking and bonding a series of flat and transparent coated plates 38, and slicing the stack along parallel diagonal planes relative to the flat surfaces of the plates (FIG. 7A). The slices are then polished to form a plurality of LOE regions 18 (FIG. 7B). Region 16 may be formed in a similar fashion.

Figures 7C, 7D:
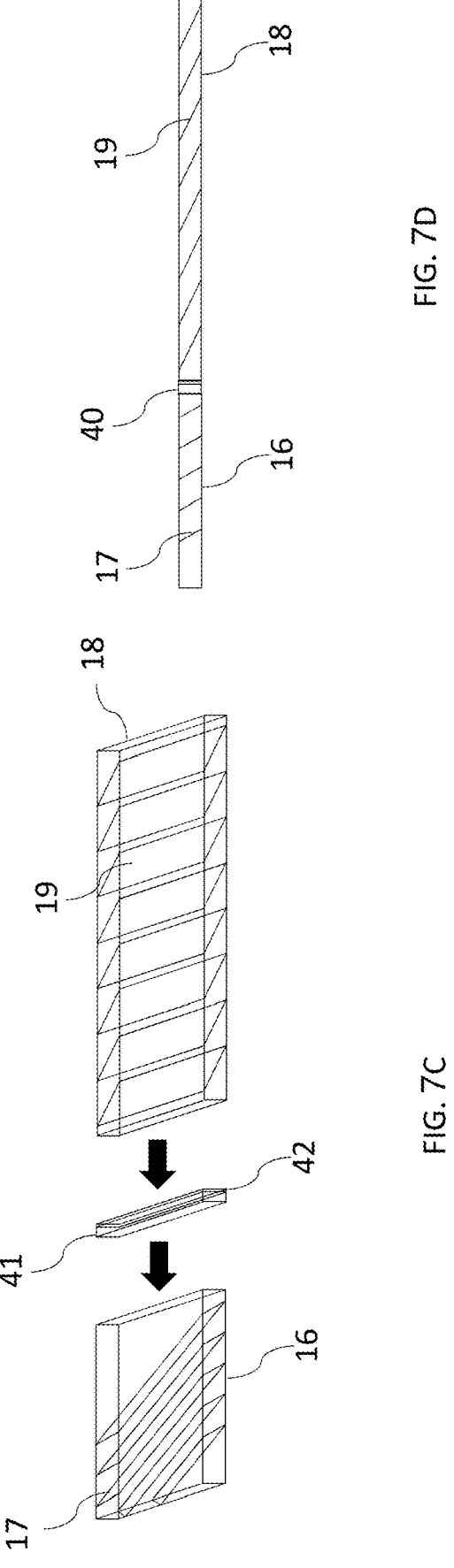

In order to form the final LOE structure including retarder, two alternative methods are proposed. FIGS. 7C-7D illustrate a first method in which a single retarder element is bonded to a single LOE region 16 on one side and a single LOE region 18 on the opposite side (FIG. 7C) to form the final LOE (FIG. 7D).

Figure 8B:
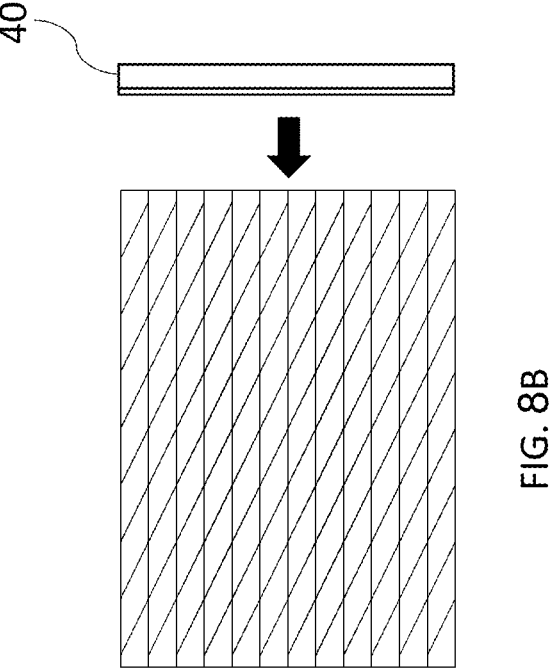
FIGS. 8A-8E illustrate an example of a manufacturing method for an LOE with embedded retarder according to another embodiment of the disclosed subject matter.
Figure 8A:
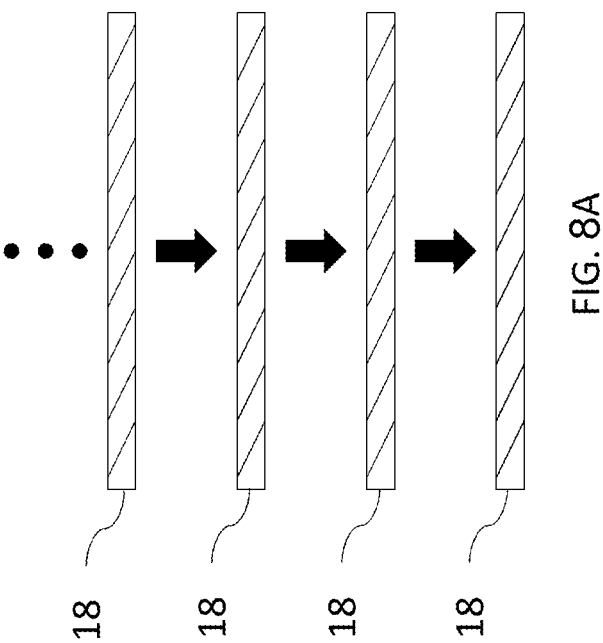
Figures 8C, 8D, 8E:
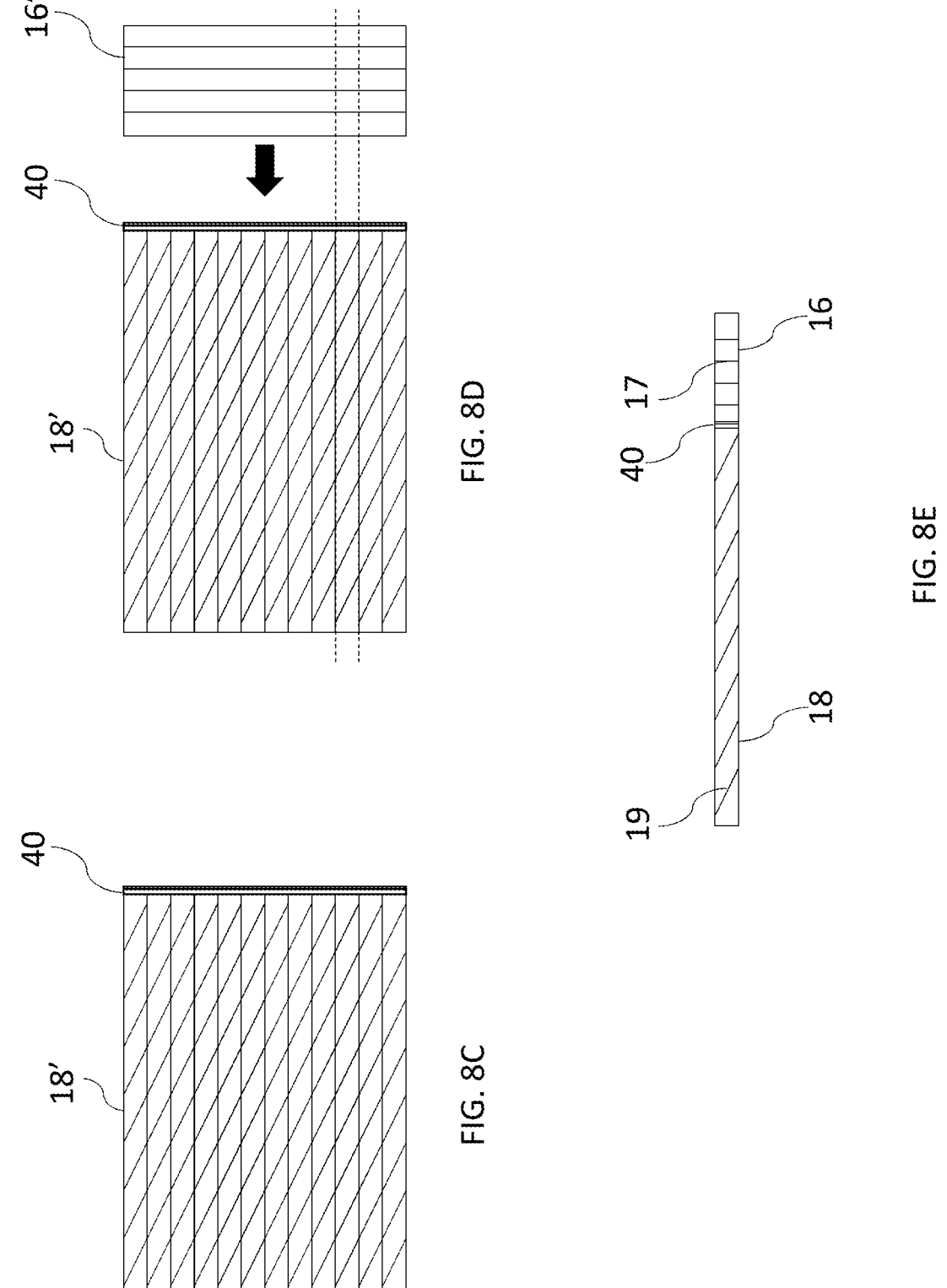

A second method is shown in FIGS. 8A-8B, in which a plurality of LOE regions 18 is stacked and bonded together (FIG. 8A), and a retarder element spanning the thickness of the stack 18' is bonded to the edge of the stack (FIG. 8B-8C). Next, as shown in FIGS. 8D-8E, a block of material 16' representing a plurality of formed but unsliced LOE regions 16 (i.e. as would be produced at an intermediate stage of LOE region 16 production) is bonded to the other side of the retarder element, and the combined block is sliced into a plurality of LOEs (FIG. 8E), each including an embedded retarder between the two sets of facets.

In each of the above alternative methods, the final LOE may need to be shaped and polished on both faces for accurate parallelism between the faces. In some embodiments, transparent cover plates may be bonded to the faces as is known in the art.

Although the present invention has thus far been described herein primarily in the context of LOEs based on partially-reflecting internal surfaces, it should be appreciated that the principles of the invention can also be implemented to advantage in light-guide optical elements which employ diffractive optical elements (DOEs) to achieve one or both of the dimensions of optical aperture expansion and/or coupling-out of image illumination from the waveguide towards the observer.

Figure 9A:
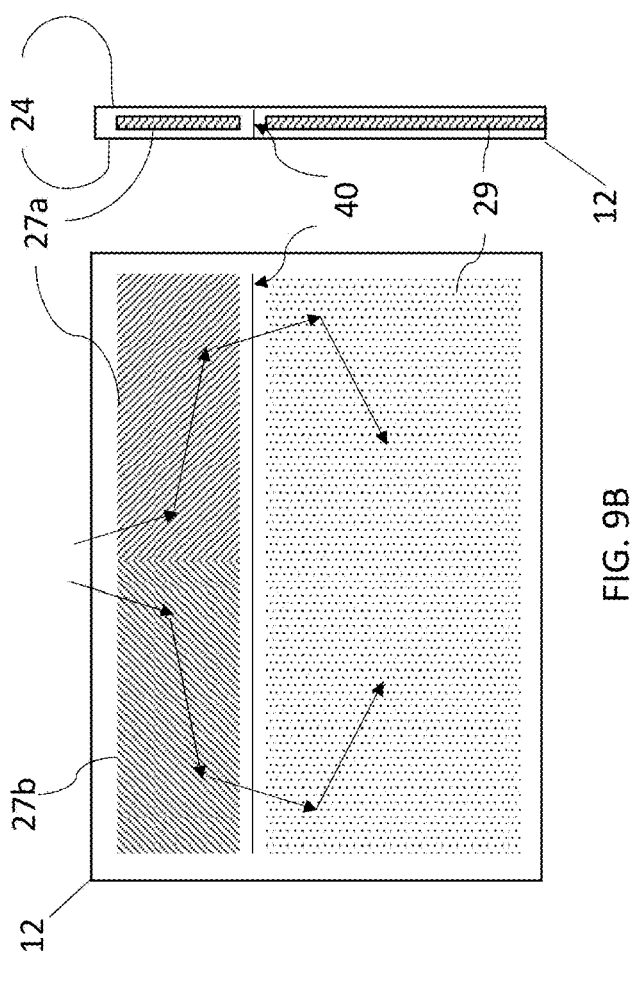
FIGS. 9A-9B illustrate an example of a diffractive LOE with an embedded retarder.
Figure 9B:
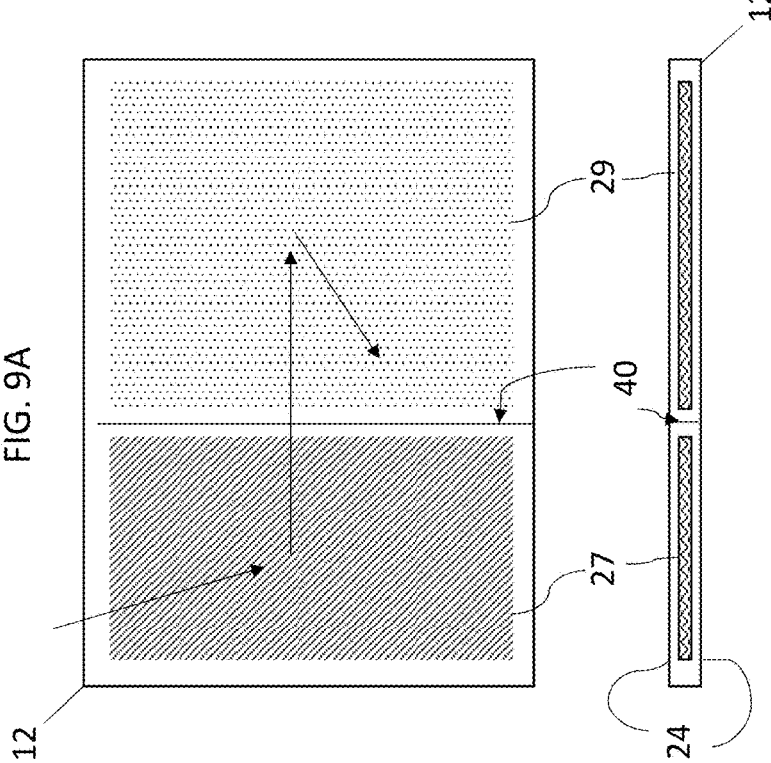

By way of non-limiting example, FIGS. 9A-9B illustrate examples of embodiments of optical systems for directing image illumination injected at a coupling-in region to an eye-motion box for viewing by an eye of a user, implemented with a diffractive waveguide. The optical system includes an LOE 12 that is formed from a transparent material and which includes a first region containing a first DOE 27, a second region containing a second DOE 29, and a set of mutually-parallel major external surfaces 24. The major external surfaces extend across the first and second regions such that both the first DOE 27 and second DOE 29 are located between the major external surfaces 24. In the example shown in FIG. 9A, image illumination is injected into one end of the first region and propagates where it propagates in one direction along the length of the first region until it is deflected by one or more DOE 27 into the second region. In the example shown in FIG. 9B, image illumination is injected into a middle portion of the first region and propagates in opposite directions until it is deflected into the second region by two or more DOEs 27*a*, 27*b*. In either case, the image illumination is out-coupled from the second region to the eye motion box (not shown) by one or more DOE 29.

As illustrated in FIGS. 9A-9B, the LOE further includes an optical retarder 40 deployed between the first region and the second region so as to rotate a polarization of light deflected by the first DOE (i.e. DOE 27 in the case of FIG.

9A, and DOEs 27a, 27b in the case of FIG. 9B) prior to reaching the second DOE 29.

It should be noted that in some embodiments each of the first and second DOEs may in practice be implemented as a pair of DOEs. In that case, "first DOE" should be understood to include a first pair of DOEs, and "second DOE" should be understood to include a second pair of DOEs.

Non-limiting examples of DOEs include, e.g., surface gratings and/or volume gratings (for example holographic gratings). In some embodiments (not shown), the LOE can include a DOE in one of the first and second regions, and facets in the other one of the first and second regions. For example, the first region can contain a DOE while the second region contains facets, or alternatively the first region can contain facets while the second region contains a DOE. It should be appreciated that the diffractive LOE can be fabricated by first manufacturing a waveguide without the embedded retarder using one of the known methods discussed above, and then "writing" a holographic grating structure onto the waveguide.

It should be appreciated that the embedded retarder described above with reference to FIG. 4 in the context of an LOE with facets, can also be used in other forms of LOEs, such as LOEs with "partial" facets in regions 16 or 18 (e.g. as described in more detail in WO 2020/049542A1) with appropriate modification if necessary as would be known to persons skilled in the art.

It is to be understood that the invention is not limited in its application to the details set forth in the description contained herein or illustrated in the drawings. The invention is capable of other embodiments and of being practiced and carried out in various ways. Hence, it is to be understood that the phraseology and terminology employed herein are for the purpose of description and should not be regarded as limiting. As such, those skilled in the art will appreciate that the conception upon which this disclosure is based may readily be utilized as a basis for designing other structures, methods, and systems for carrying out the several purposes of the presently disclosed subject matter.

What is claimed is:

1. An optical system for directing image illumination injected at a coupling-in region to an eye-motion box for viewing by an eye of a user, the optical system comprising a light-guide optical element (LOE) formed from transparent material, said LOE comprising:

a pair of mutually-parallel major surfaces supporting propagation of image illumination within said LOE by internal reflection at said major surfaces;

a first set of planar, mutually-parallel, partially-reflecting surfaces located between said major surfaces in a first region of said LOE, said first set of partially-reflecting surfaces having a first orientation;

a second set of planar, mutually-parallel, partially-reflecting surfaces located between said major surfaces in a second region of said LOE, said second set of partially-reflecting surfaces having a second orientation non-parallel to said first orientation, wherein said pair of major surfaces extend continuously across said first and second regions of said LOE without any intervening air gap, wherein said second set of partially-reflecting surfaces are at an oblique angle to said major surfaces so that a part of image illumination propagating within said LOE by internal reflection at said major surfaces from said first region into said second region is coupled out of said LOE towards the eye-motion box, and wherein said first set of partially-reflecting surfaces are oriented so that a part of image illumination propagating within said LOE by internal reflection at said major surfaces from said coupling-in region is deflected towards said second region, said LOE further comprising an optical retarder deployed between said first region and said second region so that image illumination of a first polarization state deflected by said first set of partially-reflecting surfaces is rotated to a second polarization state prior to first incidence on said second set of partially-reflecting surfaces, the image illumination remaining substantially in said second polarization state for incidence on successive surfaces of said second set of partially-reflecting surfaces.

2. The optical system of claim 1, further comprising a compact image projector (POD) optically coupled to the LOE so as to inject the image illumination into the coupling-in region of the LOE such that the image illumination with said first polarization state becomes trapped in one dimension by internal reflection at said pair of major surfaces.

3. The optical system of claim 2, wherein the POD is configured to generate a collimated image, collimated to infinity, such that the image illumination spans a range of angles corresponding to an angular field of view in two dimensions.

4. The optical system of claim 1, wherein the first set of partially-reflecting surfaces are oriented orthogonal to said major surfaces of the LOE.

5. The optical system of claim 4, wherein both the image illumination and a conjugate of the image illumination are deflected into the second region.

6. The optical system of claim 1, wherein the first set of partially-reflecting surfaces are oriented obliquely to said major surfaces of the LOE.

7. The optical system of claim 6, wherein either the image illumination or a conjugate of the image illumination is deflected into the second region.

8. The optical system of claim 1, wherein the first set of partially-reflecting surfaces successively reflect a proportion of the image illumination propagating within said first region such that the image illumination undergoes expansion in a first dimension.

9. The optical system of claim 1, wherein the second set of partially-reflecting surfaces successively reflect a proportion of the image illumination propagating within said second region such that the image illumination undergoes expansion in a second dimension.

10. The optical system of claim 1, wherein the first region is configured to achieve aperture expansion in one of an x-axis or y-axis direction, and the second region is configured to achieve aperture expansion in the other one of the x-axis or y-axis direction.

11. The optical system of claim 1, wherein the first and second set of partially-reflecting surfaces are implemented as internal surfaces coated with dielectric thin film coatings configured to reflect light that impinges on said internal surfaces over a predetermined range of angles.

12. The optical system of claim 1, wherein the retarder is deployed within the LOE such that the retarder extends between the major surfaces substantially perpendicular to said major surfaces.

13. The optical system of claim 1, wherein the retarder is deployed within the LOE such that the retarder extends between the major surfaces at an oblique angle relative to said major surfaces.

14. The optical system of claim 1, wherein the retarder is deployed within the LOE such that the retarder is oriented substantially parallel to said major surfaces.

15. The optical system of claim 14, wherein the retarder is oriented substantially adjacent to one of said major surfaces.

16. The optical system of claim 2, wherein said first polarization state is substantially s-polarized relative to said first set of partially-reflecting surfaces and said second polarization state is substantially s-polarized relative to said second set of partially-reflecting surfaces.

17. An optical system for directing image illumination injected at a coupling-in region to an eye-motion box for viewing by an eye of a user, the optical system comprising a light-guide optical element (LOE) formed from transparent material, said LOE comprising:

a pair of mutually-parallel major surfaces supporting propagation of image illumination within said LOE by internal reflection at said major surfaces;

a first set of planar, mutually-parallel, partially-reflecting surfaces located between said major surfaces in a first region of said LOE, said first set of partially-reflecting surfaces having a first orientation;

a second set of planar, mutually-parallel, partially-reflecting surfaces located between said major surfaces in a second region of said LOE, said second set of partially-reflecting surfaces having a second orientation non-parallel to said first orientation, wherein said pair of major surfaces extend continuously across said first and second regions of said LOE without any intervening air gap, wherein said second set of partially-reflecting surfaces are at an oblique angle to said major surfaces so that a part of image illumination propagating within said LOE by internal reflection at said major surfaces from said first region into said second region is coupled out of said LOE towards the eye-motion box, and wherein said first set of partially-reflecting surfaces are oriented so that a part of image illumination propagating within said LOE by internal reflection at said major surfaces from said coupling-in region is deflected towards said second region, said deflection being a sole redirection of an in-plane component of a propagation direction of the image illumination occurring between the coupling-in region and the second region of said LOE, said LOE further comprising an optical retarder deployed between said first region and said second region so that image illumination of a first polarization state deflected by said first set of partially-reflecting surfaces is rotated to a second polarization state prior to first incidence on said second set of partially-reflecting surfaces, the image illumination remaining substantially in said second polarization state for incidence on successive surfaces of said second set of partially-reflecting surfaces.

* * * * *